United States Patent

[11] 3,622,602

[72] Inventor Paul D. Klimstra
 Northbrook, Ill.
[21] Appl. No. 803,445
[22] Filed Feb. 28, 1969
[45] Patented Nov. 23, 1971
[73] Assignee G. D. Searle & Co.
 Chicago, Ill.

[54] STEREOSPECIFIC REDUCTION OF 3-KETO STEROIDS
 8 Claims, No Drawings

[52] U.S. Cl. .................................................. 260/397.5
[51] Int. Cl. .................................................. C07c 169/20
[50] Field of Search ........................................ 260/397.5

[56] References Cited
UNITED STATES PATENTS
3,176,013  3/1965  Klimstra ........................ 260/239.55
FOREIGN PATENTS
6,712,308  3/1968  Netherlands ..................

*Primary Examiner*—Lewis Gotts
*Assistant Examiner*—Ethel G. Love
*Attorneys*—John M. Brown, John J. Kolano, Elliot N. Schubert, Walter C. Ramm and Helmut A. Wegner ABSTRACT: The reduction of 17α-ethynyl-17β-hydroxyestr-4-en-3-one with the reducing agent produced from an alkali metal hydride and a tertiary carbinol containing at least five carbon atoms results in selective production of the 3β-hydroxy epimer in excellent yield.

STEREOSPECIFIC REDUCTION OF 3-KETO STEROIDS

The present invention is concerned with a novel process involving the stereospecific reduction of 17α- ethynyl-17β-hydroxyestr-4-en-3-one to afford the desired 3β-hydroxy epimer. 17α-Ethynylestr-4-ene-3β, 17β-diol, as is disclosed in U.S. Pat. No. 2,843,609, is a potent progestational agent and is useful also as the immediate precursor of the corresponding 3,17-diacetate, i.e. the progestin component of a commercial anti-ovulatory product.

Previous methods available for manufacture of 17α-ethynylestr-4-ene-3β, , 17β-diol suffer from the disadvantage that a substantial quantity of the 3α-isomer is formed in the reduction. Not only is the yield thus reduced but isolation of the desired product is made much more difficult due to the presence of that impurity. Sondheimer et al., tetrahedron, 5, 15 (1959) Tetrahedron, thus reported that the reduction of 17α-ethynyl-17β-hydroxyestr-4-en-3-one with sodium borohydride resulted in a nonhomogeneous product which was very difficult to purify. The use of lithium aluminum hydride or lithium tri-(tertiary-butoxy) aluminum hydride to effect this reduction is also known in the art, but again a substantial proportion of the undesired epimer is formed. Use of the latter reducing agents is described in British Pat. No. 776,427 and U.S. Pat. No. 3,176,013.

By the present invention it has been surprisingly discovered that the complex formed between an alkali metal hydride and a tertiary carbinol in which at least one of the carbon chains contains two or more carbon atoms results in stereospecific reduction to afford the desired 3β-epimer. Preferred alkali metal aluminum hydrides are sodium aluminum hydride, potassium aluminum hydride and lithium aluminum hydride. The carbinols suitable for use in this process thus contain at least five carbon atoms and are exemplified by ethyl dimethyl carbinol, diethyl methyl carbinol, triethyl carbinol, isopropyl dimethyl carbinol, dimethyltertiary-butylcarbinol, tertiary-amyl dimethylcarbinol, etc. carbinols containing not more than a total of 18 carbon atoms are particularly preferred. A ratio of three moles of the carbinol to one mole of the hydride is particularly preferred.

The instant process is suitably conducted in a nonpolar inert organic solvent medium. Ethers such as diethyl ether and tetrahydrofuran are particularly suitable solvents. The process is conveniently carried out at temperatures between 0° and 30° C. A specific example of the process is the reaction of 17α-ethynyl-17β-hydroxyestr-4 -en-3-one with lithium aluminum hydride and a 3 molar quantity of triethyl carbinol in tetrahydrofuran at a temperature between 0° and 30°, thus affording the desired 17α-ethynylestr-4-ene-3β,17β-diol.

The invention will appear more fully from the examples which follow. These examples are given by way of illustration only and are not to be construed as limiting the invention either in spirit or in scope as many modifications both in materials and methods will be apparent from this disclosure to those skilled in the art. Temperatures are given in degrees Centigrade (°C.) and quantities of materials in parts by weight unless otherwise noted.

EXAMPLE 1

To a solution of 1.15 parts of lithium aluminum hydride in 27 parts of tetrahydrofuran, under nitrogen, is added, dropwise at 0°–5° with cooling and stirring over a period of about 45 minutes, a solution of 10.5 parts of triethyl carbinol in 18 parts of tetrahydrofuran. That mixture is stirred for about 10 minutes and a solution of three parts of 17α-ethynyl-17β-hydroxyestr-4-en-3-one in 67.5 parts of tetrahydrofuran is added over a period of a few minutes. Stirring is continued for about 2 hours, during which time the mixture is allowed to warm to room temperature. It is then poured into 1300 parts of ice-cold water containing 42 parts of acetic acid and the resulting mixture is stirred for a few minutes, then filtered. The product thus obtained is washed on the filter with a large volume of water and dried in air to afford 2.95 parts of crude 17α-ethynylestr-4-ene-3β,17β -diol, melting at 140.5°142°and characterized by an $[\alpha]_{26}$, in chloroform, of −21°.

Purification of 2.5 parts of that crude product is effected by recrystallization from aqueous acetone, thus affording 2.25 parts of pure 17α-ethynylestr-4-ene-3β,17β-diol, melting at 141°–143° and characterized by an $[\alpha]_D{}^{26}$, in chloroform, of −27°.

EXAMPLE 2

To a solution of 2 parts of lithium aluminum hydride in 90 parts of tetrahydrofuran, at 0°–5°, is added, dropwise with stirring over a period of about 45 minutes, a solution of 13.9 parts of ethyl dimethyl carbinol in 22.5 parts of tetrahydrofuran. That mixture is stirred for about 30 minutes, at the end of which time a solution of 5 parts of 17α-ethynyl-17β-hydroxyestr-4-en-3-one in 67.5 parts of tetrahydrofuran is added over a period of about 15 minutes. The resulting reaction mixture is stirred for about 2 hours, during which time it is allowed to warm to room temperature. The mixture is then poured carefully into a mixture of 1400 parts of water, ice and 52.5 parts of acetic acid. The resulting precipitate is collected by filtration, washed with water and dried to afford 17α-ethynylestr-4-ene-3β, 17β-diol, melting at about 136°–138° and characterized by an $[\alpha]_D{}^{26}$, of −21°. Recrystallization of 2.1 parts of that crude product from aqueous acetone results in 1.65 parts of 17α-ethynylestr-4-ene-3β, 17β-diol, melting at about 143°–145° and characterized by $[\alpha]_D{}^{26}$, in chloroform of −26°.

What is claimed is:

1. The process which comprises contacting 17α-ethynyl-17 β-hydroxyestr-4-en-3-one with lithium aluminum hydride and a tertiary carbinol containing at least five carbon atoms and isolating 17α-ethynylestr-4-ene-3β, 17β-diol.

2. As in claim 1, the process which comprises contacting 17α-ethynyl-17β-hydroxyestr-4-en-3-one with lithium aluminum hydride and dimethyl ethyl carbinol and isolating 17α-ethynylestr-4-ene-3β, 17β-diol.

3. As in claim 1, the process which comprises contacting 17α-ethynyl-17β-hydroxyestr-4-en-3-one with lithium aluminum hydride and triethyl carbinol and isolating 17α-ethynylestr-4-ene-3β, 17β-diol.

4. As in claim 1, the process which comprises contacting 17α-ethynyl-17β-hydroxyestr-4-en-3-one with lithium aluminum hydride and a tertiary carbinol containing at least five carbon atoms in tetrahydrofuran and isolating 17α-ethynylestr-4-ene-3β, 17β-diol.

5. As in claim 1, the process which comprises contacting 17α-ethynyl-17β-hydroxyestr-4-en-3-one with lithium aluminum hydride and dimethyl ethyl carbinol in tetrahydrofuran and isolating 17α-ethynylestr-4-ene-3β, 17β-diol.

6. As in claim 1, the process which comprises contacting 17α-ethynyl-17β-hydroxyestr-4-en-3-one with lithium aluminum hydride and triethyl carbinol in tetrahydrofuran and isolating 17α-ethynylestr-4-ene-3β, 17β-diol.

7. As in claim 1, the process which comprises contacting 17α-ethynyl-17β-hydroxyestr-4-en-3-one with o lithium aluminum hydride and dimethyl ethyl carbinol in tetrahydrofuran at 0°–30° and isolating 17α-ethynylestr-4-ene-3β, 17β-diol.

8. As in claim 1, the process which comprises contacting 17α-ethynyl-17β-hydroxyestr-4-en-3-one with lithium aluminum hydride and triethyl carbinol in tetrahydrofuran at 0°–30 and isolating 17α-ethynylestr-4-ene-3β, 17β-diol.

* * * * *